United States Patent
Loh et al.

(10) Patent No.: US 10,450,421 B2
(45) Date of Patent: Oct. 22, 2019

(54) SYNTHESIS OF MULTIARM POLY[(R)-3-HYDROXYBUTYRATE] AND ITS DERIVATIVES

(71) Applicant: AGENCY FOR SCIENCE, TECHNOLOGY AND RESEARCH, Singapore (SG)

(72) Inventors: Xian Jun Loh, Singapore (SG); Sing Shy Liow, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 15/551,591

(22) PCT Filed: Feb. 16, 2016

(86) PCT No.: PCT/SG2016/050080
§ 371 (c)(1),
(2) Date: Aug. 16, 2017

(87) PCT Pub. No.: WO2016/133461
PCT Pub. Date: Aug. 25, 2016

(65) Prior Publication Data
US 2018/0044481 A1    Feb. 15, 2018

(30) Foreign Application Priority Data

Feb. 16, 2015    (SG) .......................... 10201501188U

(51) Int. Cl.
*C08G 63/06*    (2006.01)
*C08G 81/02*    (2006.01)
(Continued)

(52) U.S. Cl.
CPC ............. *C08G 81/027* (2013.01); *C08F 8/26* (2013.01); *C08F 20/34* (2013.01); *C08F 220/34* (2013.01);
(Continued)

(58) Field of Classification Search
CPC ............. C08G 18/6725; C08G 18/672; C08G 18/673; C08G 18/4283; C08G 20/12; C08G 63/912; C08G 63/6852; C08G 63/06
See application file for complete search history.

(56) References Cited

FOREIGN PATENT DOCUMENTS

WO    WO 02/06368 A2    1/2002

OTHER PUBLICATIONS

PCT International Search Report for PCT Counterpart Application No. PCT/SG2016/050080, 5 pgs. (dated Apr. 4, 2016).
(Continued)

*Primary Examiner* — Mark S Kaucher
(74) *Attorney, Agent, or Firm* — Womble Bond Dickinson (US) LLP

(57) ABSTRACT

Provided herein is a polymer having formula I:

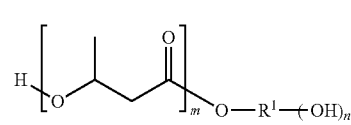

Figure 1:
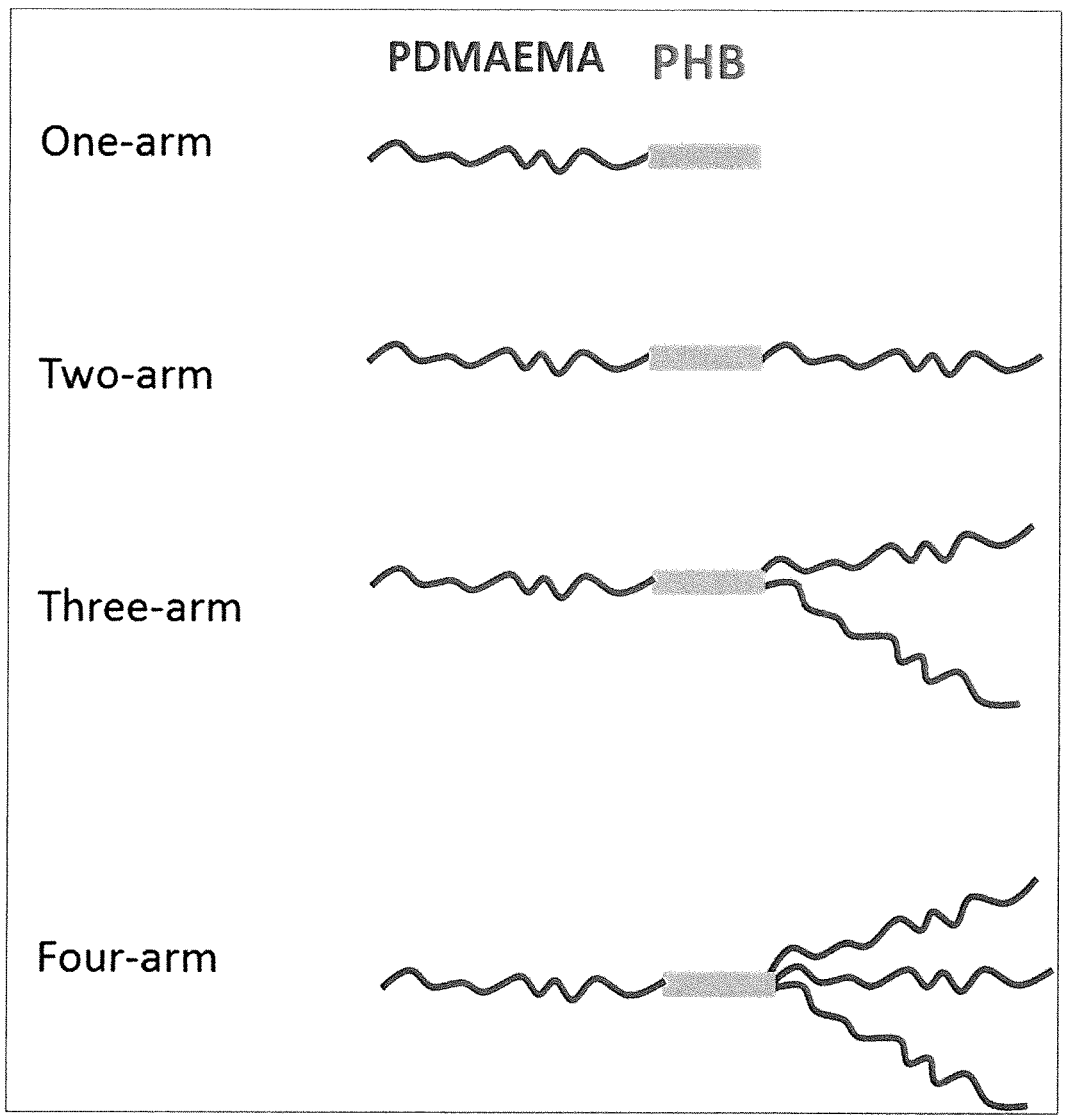

where m, n, and $R^1$ are as defined herein, and the polymer has a number average molecular weight of the polymer of from 500 to 80,000 Daltons. Also provided herein are block copolymers of the polymer of formula I, as well as processes to make the polymer and block copolymers thereof.

11 Claims, 6 Drawing Sheets

(51) Int. Cl.
| | |
|---|---|
| C08F 20/34 | (2006.01) |
| C08F 220/34 | (2006.01) |
| C08F 8/26 | (2006.01) |
| C08G 63/682 | (2006.01) |
| C08G 63/685 | (2006.01) |
| C08G 63/91 | (2006.01) |
| C08G 18/73 | (2006.01) |
| C08G 18/75 | (2006.01) |
| C08G 18/76 | (2006.01) |
| C08G 18/42 | (2006.01) |

(52) U.S. Cl.
CPC ......... *C08G 18/4283* (2013.01); *C08G 18/73* (2013.01); *C08G 18/755* (2013.01); *C08G 18/7621* (2013.01); *C08G 18/7664* (2013.01); *C08G 18/7671* (2013.01); *C08G 63/06* (2013.01); *C08G 63/6822* (2013.01); *C08G 63/6852* (2013.01); *C08G 63/912* (2013.01); *C08G 2230/00* (2013.01)

(56) References Cited

OTHER PUBLICATIONS

PCT Written Opinion for PCT Counterpart Application No. PCT/SG2016/050080, 6 pgs. (dated May 5, 2016).
Peng Li, et al., "A polycationic antimicrobial and biocompatible hydrogel with microbe membrane suctioning ability," Nature Materials, vol. 10, No. 2, pp. 149-156 (Feb. 2011).
Invitation to Respond to Written Opinion for counterpart Singapore patent application No. 11201706692ZX. 10 pgs. (dated Apr. 26, 2018).
PCT International Search Report for PCT Counterpart Application No. PCT/SG2016/050079, 6 pgs. (dated May 5, 2016).
PCT Written Opinion for PCT Counterpart Application No. PCT/SG2016/050079, 6 pgs. (dated May 5, 2016).
Xian Jun Loh, et al., "Incorporation of Poly[(R)-3-hydroxybutyrate] into Cationic Copolymers Based on Poly(2-(dimethylamino)ethyl methacrylate) to improve Gene Delivery," Macromol. Biosci., vol. 13, No. 6, pp. 1092-1099 (May 22, 2013).
Ana Maria Carmona-Ribeiro, et al., "Cationic Antimicrobial Polymers and Their Assemblies," Int. J. Mol. Sci., vol. 14, No. 5, pp. 9906-9946 (May 10, 2013).
Xian Jun Loh, et al., "Synthesis of Novel Biodegradable Thermoresponsive Triblock Copolymers Based on Poly[(R)-3-hydroxybutyrate] and Poly(N-isopropylacrylamide) and Their Formation of Thermoresponsive Micelles," Macromolecules, vol. 42, No. 1, pp. 194-202 (Dec. 11, 2008).
Lu Jiang, et al., "Synthesis of a new poly([R]-3-hydroxybutyrate) RAFT agent," Polym. Chem., vol. 7, No. 9, pp. 1693-1700 (Jan. 4, 2016).
Jun Li. et al., "Synthesis and Characterization of New Biodegradable Amphiphilic Poly(ethylene oxide)-b-poly[(R)-3-hydroxybutyrate]-b-poly(ethylene oxide) Triblock Copolymers," Macromolecules, vol. 36, No. 8, pp. 2661-2667 (Mar. 27, 2003).
Thomas D. Hirt, et al. "Telechelic diols from poly[(R)-3-hydroxybutyric acid] and poly([(R)-3-hydroxybutyric acid]-co-[(R)-3-hydroxyvaleric acid]," Macromol. Chem. Phys., vol. 197, No. 5, pp. 1609-1614 (May 31, 1996).
Notice of Eligibility for Grant and Examination Report issued by the Intellectual Property Office of Singapore on Nov. 10, 2018 for patent application No. 11201706692X.

SYNTHESIS OF MULTIARM POLY[(R)-3-HYDROXYBUTYRATE] AND ITS DERIVATIVES

CROSS-REFERENCE TO RELATED APPLICATIONS

This patent application is a U.S. National Phase Application under 35 U.S.C. § 371 of International Application No. PCT/SG2016/050080, filed on 16 Feb. 2016, entitled THE SYNTHESIS OF MULTIARM POLY[(R)-3-HYDROXY-BUTYRATE] AND ITS DERIVATIVES, which claims priority to Singapore application No. 10201501188U, filed on 16 Feb. 2015.

The current invention relates to the generation of a variety of polymeric architectures from PHB—as multiarm PHBs, and then coupling these multiarm PHBs with different polymers such as (2-dimethylamino)ethyl methacrylate (DMAEMA), 2-hydroxyethyl methacrylate (HEMA) and N-isopropylacrylamide) (NIPAM) to create novel polymers with different properties such as antimicrobial properties, amphiphilic, thermo-responsive and pH-responsive etc.

The listing or discussion of an apparently prior-published document in this specification should not necessarily be taken as an acknowledgement that the document is part of the state of the art or is common general knowledge.

Poly[(R)-3-hydroxybutyrate] (PHB) is a natural biodegradable polyester, which is highly crystalline and hydrophobic, showing a greater hydrophobicity than either poly (lactic acid) or poly(ε-caprolactone). PHB is nontoxic and it degrades to D-3-hydroxybutyrate, which is a natural constituent of human blood. As a result of these advantageous properties, PHB may be suitable for a variety of biomedical applications, such as a drug carrier and as a tissue engineering scaffold. Because of its inherent hydrophobicity, PHB is rarely used in applications that require good water solubility, such as polymeric micelles and gels.

There remains a need to develop new and useful polymeric architectures that are suitable to be functionalised for a range of roles.

The following drawings that aid to described the current invention are provided.

FIG. 1: Depicts block copolymers that make use of the core compounds discussed hereinbefore with poly[(2-dimethylamino)ethyl methacrylate (DMAEMA)].

Figure 2:
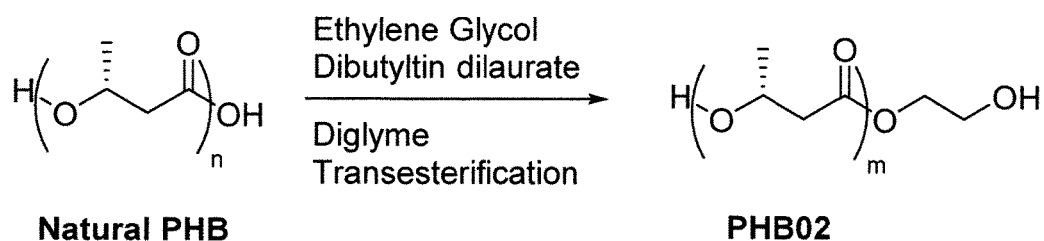

FIG. 2: Synthesis scheme of a PHB-diol.

Figure 3:
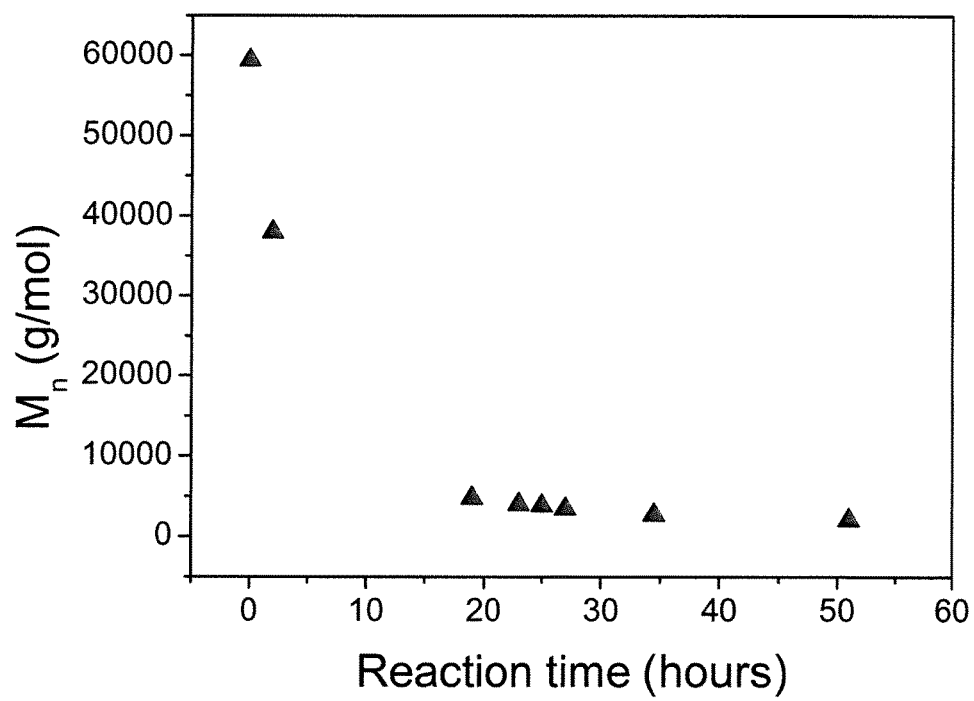

FIG. 3: Depicts the molecular weight (Mn) versus time (hours) for the PHB-diol reaction with ethylene glycol, as set out in the synthesis of multiarm PHB (two-arm) experimental section.

Figure 4:
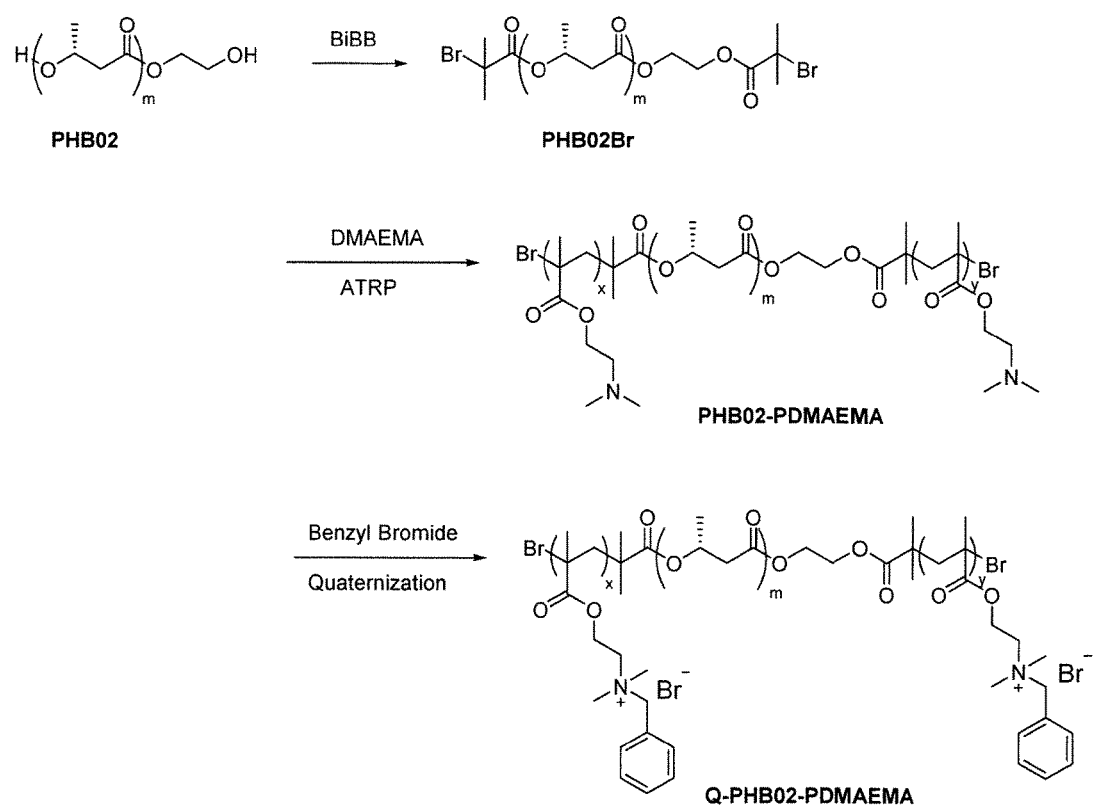

FIG. 4: Depicts the reaction of PHB02Br with DMAEMA and its subsequent quaternization.

FIG. 5: Depict $^1$H NMR spectra of PHB04 series: (A) PHB04, (B) PHB04Br, and (C) PHB04-PDMAEMA.

Figure 6A:
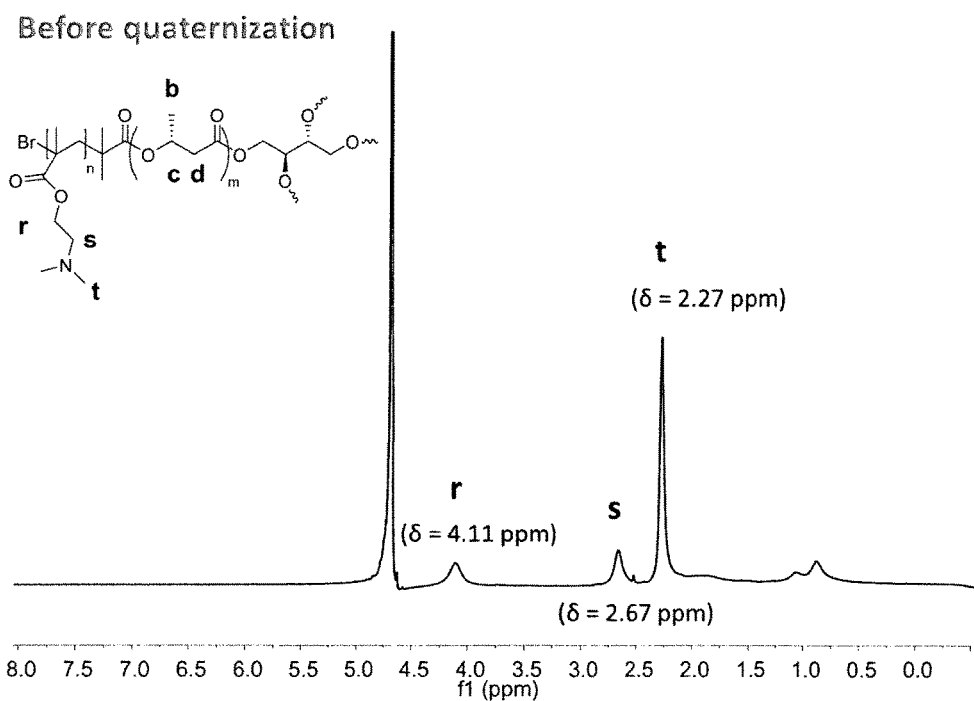
Figure 6B:
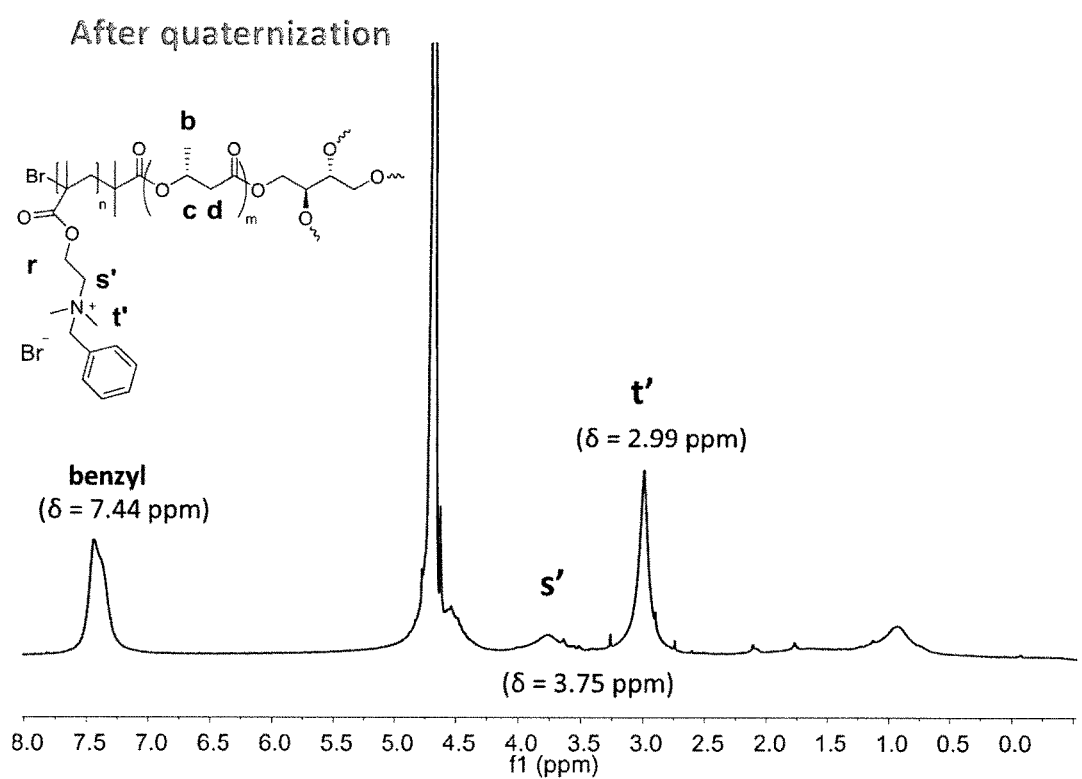

FIG. 6: $^1$H NMR (in D$_2$O) of PHB04-PDMAEMA before (A) and after (B) quaternization.

We have now surprisingly discovered that PHB can be conveniently functionalised to provide a number of platform polymeric architectures that may provide a number of differing functions. For example, said functionalisation may provide antimicrobial polymers, amphiphilic block copolymers, thermoplastic elastomers, shape memory polymers and thermogelling copolymers. Applications of such polymers include biomedical technology (antimicrobial coatings for surgical devices/sterilisation, tissue engineering scaffolds, drug/gene delivery, wound dressing/eye patch, eye drops), as well as in the electronics industry and as a lubricant/rheologic modifier.

Thus, in a first aspect of the invention, there is provided a polymer having formula I:

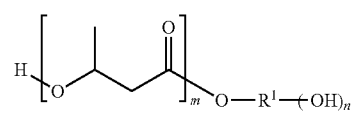

wherein:
m represents the repeating unit of the polymer;
$R^1$ represents a straight-chain or branched $C_{1-14}$ alkyl or a $C_{3-10}$ cycloalkyl that are substituted with n hydroxyl groups;
n represents 0 to 8, and wherein
the number average molecular weight of the polymer is from 500 to 80,000 Daltons.

It will be appreciated that the hydroxyl groups may be present on any carbon of $R^1$ that provides a stable compound. For example, any carbon atom not bonded directly to the ester terminus of the PHB polymeric chain may carry one or more (i.e. one) hydroxyl groups.

It will also be appreciated that the polymeric backbone of the polymer of formula I is derived from poly[3-hydroxybutyrate]. The methyl group on the repeating unit of poly [3-hydroxybutyrate] is chiral and may exist in the (R)- or (S)-configuration. While the polymer may have a backbone that only contains (R)- or only contain (S)-repeating units, it is explicitly contemplated that the polymeric backbone may contain both (R)- and (S)-repeating units, whether in a random pattern, a repeating block pattern or in an alternating pattern. For the avoidance of doubt, when used herein "PHB" may be applied to all of the above-mentioned options. In specific embodiments of the invention that may be mentioned herein, the poly[3-hydroxybutyrate] used may be poly[(R)-3-hydroxybutyrate].

In embodiments of the invention:
(a) the polymer may have a number average molecular weight of from 750 to 60,000 Daltons (e.g. from 1,000 to 30,000 Daltons, such as 1,500 to 10,000 Daltons, such as from 2,000 to 6,000 Daltons);
(b) $R^1$ may represent a straight-chain or branched $C_{1-6}$ alkyl (e.g. a straight-chain $C_{2-5}$ alkyl);
(c) n may represent 0 to 5 (e.g. n represents 0 to 4, 0 or 2 to 4, or 3 to 4);
(d) $R^1$ may represent a straight-chain $C_{4-8}$ alkyl and n may represent 0.

In particular embodiments of the invention, —$R^1$(OH)$_n$ may represent hexyl or a fragment selected from formula Ia-Ic (e.g. —$R^1$(OH)$_n$ may represent formula Ib or formula Ic),

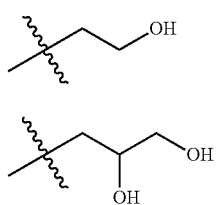

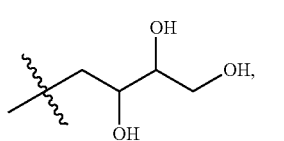
Ic where the wavy line represents the point of attachment of the fragment —R¹ (OH)$_n$ to the rest of the polymer. For example, when:
(a) R¹ represents hexyl, the number average molecular weight of the polymer is from 750 to 60,000 Daltons (e.g. from 1,000 to 7,000 Daltons, such as from 1,700 to 2,000 Daltons);
(b) R¹ represents the fragment of formula Ia, the number average molecular weight of the polymer is from 750 to 60,000 Daltons (e.g. from 1,000 to 7,000 Daltons, such as from 2,000 to 2,200 Daltons);
(c) R¹ represents the fragment of formula Ib, the number average molecular weight of the polymer is from 750 to 60,000 Daltons (e.g. from 1,000 to 7,000 Daltons, such as from 6,000 to 6,500 Daltons); and
(d) R¹ represents the fragment of formula Ic, the number average molecular weight of the polymer is from 750 to 60,000 Daltons (e.g. from 1,000 to 7,000 Daltons, such as from 4,500 to 4,700 Daltons).

In particular embodiments that may be mentioned herein, in the polymer of formula I, n may represent 0 or 2 to 4.

It will be appreciated that the resulting polymeric materials are multiarm PHBs that may be used as a platform to build more complex polymeric structures, while retaining the multiarm PHBs as the core architecture. Thus, the polymer of formula I may comprise part of a block copolymer, where one of more of the —OH groups in the compound of formula I instead represents —O— and serves to link the compound of formula I to the other components of said block copolymer. This block copolymer may be produced by:
(a) the copolymerisation of the multiarm PHBs described hereinbefore with suitable di- or polyisocyanate to make polyurethanes (e.g. diphenylmethane diisocyanate, toluene diisocyanate, hexamethylene diisocyanate, isophorone diisocyanate and polymeric diphenylmethane diisocyanate);
(b) following functionalisation with a suitable reversible addition-fragmentation chain-transfer (RAFT) polymerization agent, copolymerisation with a monomer suitable for use in RAFT polymerization to form a RAFT-polymerised block copolymer;
(c) following functionalisation with a suitable atom transfer radical polymerization (ATRP) initiator, copolymerisation with a monomer suitable for use in ATRP polymerization to form a ATRP-polymerised block copolymer.

In keeping with the above, FIG. 1 depicts in cartoon fashion the formation of block copolymers that make use of the core compounds discussed hereinbefore with (2-dimethylamino)ethyl methacrylate (DMAEMA). As depicted, the polymeric core may have at least one arm available for functionalisation, but may also have two or more, such as 3 or more arms suitable for functionalisation (i.e. 3 or 4 arms). When the polymer core has more than two arms (i.e. 3 or more arms), the polymeric core the core may be referred to herein as a "star polymer". In addition, the term "star polymer" may also relate to the resulting block copolymers as described hereinbefore, which may also be referred to herein as "star copolymers".

While not shown in FIG. 1, the resulting copolymers may themselves be further functionalised, such as by quaternisation, which may also provide particular advantages to the block copolymers made using the core PHB polymers described herein before.

Thus, the core architecture and/or the resulting block copolymers may provide or have one or more of the following advantages:
(i) the polymers may have a higher cationic charge density than linear polymers (e.g. quarternised block copolymers made using star-shaped core PHBs (3- or more-armed PHBs)), which may be useful for antimicrobial and/or gene delivery applications;
(ii) the multiarm PHB polymer provides biodegradability within the core of the block copolymer, where the core PHB structure can be readily hydrolysed and so leads to the formation of shorter branch molecules that may be easier to recycle (this may be particularly advantageous for materials that use star-shaped core structures);
(iii) the star-shaped core structures may provide copolymers that can provide superior performance as a rheologic modifier, breaking the relationship between thickening efficiency, shear stability and viscosity index that limits conventional linear polymethacrylate viscosity modifier technology;
(iv) cationic star copolymers may be less toxic compared to linear polymers with a similar charge density because the branches containing the charges are shorter in size.

In a second aspect of the invention, there is provided a process of preparing a polymer, which process comprises a transesterification reaction to produce a compound of formula I, as defined hereinbefore (e.g. in the first aspect of the invention and its embodiments), comprising reaction of a P3HB having a number average molecular weight of from 20,000 to 200,000 Daltons with an alcohol of formula II, $$R^1OH \qquad\qquad II$$

wherein:
R¹ represents a straight-chain or branched $C_{1-14}$ alkyl, a straight-chain or branched $C_{1-14}$ alkyl substituted with from 0 to 8 hydroxyl groups, a $C_{1-10}$ cycloalkyl or a $C_{1-10}$ cycloalkyl substituted with from 0 to 8 hydroxyl groups, and
the alcohol of formula II is present in a molar excess of from 100 times to 500 times (e.g. 300 times) the molar amount of the P3HB.

When used herein, "P3HB" refers to poly[3-hydroxybutyrate]. As noted hereinbefore, the methyl group on the repeating unit of poly[3-hydroxybutyrate] is chiral and may exist in the (R)- or (S)-configuration. Given this, when used herein "P3HB" may refer to a poly[3-hydroxybutyrate] where the polymer has a backbone that only contains (R)- or only contain (S)-repeating units, as well as a backbone that contains both (R)- and (S)-repeating units, whether in a random pattern, a repeating block pattern or in an alternating pattern. For the In specific embodiments of the invention that may be mentioned herein, the P3HB used may be poly[(R)-3-hydroxybutyrate]. "P3HB" may be used interchangeably with "PHB".

In embodiments of the process, the transesterification reaction may:
(a) be conducted at a temperature of from 100° C. to 160° C. for from 1 to 10 days, optionally at a temperature of 140° C. for from 2 to 5 days;
(b) comprise an organic solvent (e.g. diglyme), optionally wherein a concentration of the alcohol of formula II in the organic solvent is from 0.1 M to 1 M (e.g. from 0.4 M to 0.5 M);
(c) further comprise a catalyst (e.g. a tin-based catalyst and/or a titanium-based catalyst, such as dibutyltin dilaurate);
(d) be conducted under an inert atmosphere.

In yet further embodiments of the process, the compound of formula II may be one where:
(i) $R^1$ represents a straight-chain or branched $C_{1-6}$ alkyl (e.g. a straight-chain $C_{2-5}$ alkyl);
(ii) n may represent 0 to 5 (e.g. n represents 0 to 4, 0 or 2 to 4, or 3 to 4);
(iii) $R^1$ may represent a straight-chain $C_{4-6}$ alkyl and n may represent 0.

In particular embodiments of the process, in the compound of formula II, $R^1OH$ may represent hexanol or a compound selected from formula Ia'-Ic' (e.g. —$R^1(OH)_n$ may represent formula Ib' or formula Ic'),

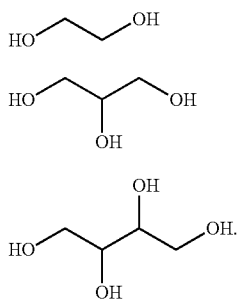

For example:
(a) when $R^1$ represents hexanol, the number average molecular weight of the compound of formula I is from 750 to 60,000 Daltons (e.g. from 1,000 to 7,000 Daltons, such as from 1,700 to 2,000 Daltons);
(b) when $R^1OH$ represents the compound of formula Ia, the number average molecular weight of the compound of formula I is from 750 to 60,000 Daltons (e.g. from 1,000 to 7,000 Daltons, such as from 2,000 to 2,200 Daltons);
(c) when $R^1OH$ represents the compound of formula Ib, the number average molecular weight of the compound of formula I is from 750 to 60,000 Daltons (e.g. from 1,000 to 7,000 Daltons, such as from 6,000 to 6,500 Daltons); and
(d) when $R^1OH$ represents the compound of formula Ic, the number average molecular weight of the compound of formula I is from 750 to 60,000 Daltons (e.g. from 1,000 to 7,000 Daltons, such as from 4,500 to 4,700 Daltons).

In particular embodiments that may be mentioned herein, in the polymer of formula I, n may represent 0 or 2 to 4.

It will be appreciated that the process described hereinbefore enables one to make the core polymer architectures described in the context of the first aspect of the invention.

However, as indicated hereinbefore, it is possible to make use of these core polymeric structures to form more complex polymers.

Thus, in a third aspect of the invention, there is provided a process to prepare a block copolymer of formula VI that comprises
(a) reacting a compound of formula I:

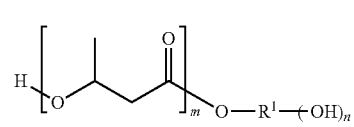

wherein:
m represents the repeating unit of the polymer;
$R^1$ represents a straight-chain or branched $C_{1-14}$ alkyl or a $C_{3-10}$ cycloalkyl that are substituted with n hydroxyl groups;
n represents 0 to 8, and wherein
the number average molecular weight of the polymer is from 500 to 80,000 Daltons,
with a sufficient quantity of a suitable atom transfer radical polymerization (ATRP) initiator of formula III:

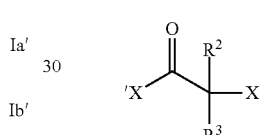

where X and 'X are independently selected from Cl, Br and I; and
$R^2$ and $R^3$ are independently selected from $C_{1-6}$ alkyl,
to provide a compound of formula IV:

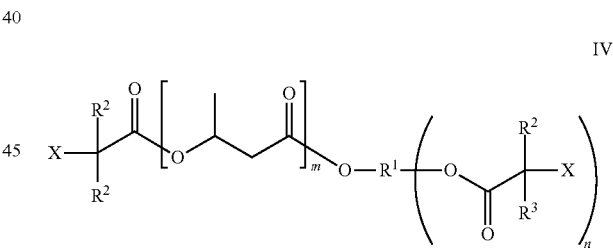

where X, $R^2$ and $R^3$ are as defined for the compound of formula III and $R^1$, m and n are as defined for the compound of formula I (e.g. as above and/or in the first aspect of the invention and its embodiments); and
(b) reacting the compound of formula IV under ATRP conditions with a monomer compound of formula V:

where:
$R^4$ represents $C_{6-10}$ aryl, $C_{5-10}$ hetroaryl, $C(O)R^{6a}$, $C(O)OR^{6b}$ and $C(O)NR^{7a}R^{7b}$;

$R^5$ represents H or straight-chain or branched $C_{1-6}$ alkyl;
$R^{6a}$ and $R^{6b}$ independently represent a straight-chain or branched $C_{1-8}$ alkyl or straight-chain or branched $C_{1-6}$ alkyl substituted by one or more of the substituents selected from $OR^8$ or $NR^9R^{10}$;
$R^{7a}$, $R^{7b}$, $R^8$, $R^9$ and $R^{10}$ are independently selected from H or straight-chain or branched $C_{1-6}$ alkyl,
to provide a compound of formula VI:

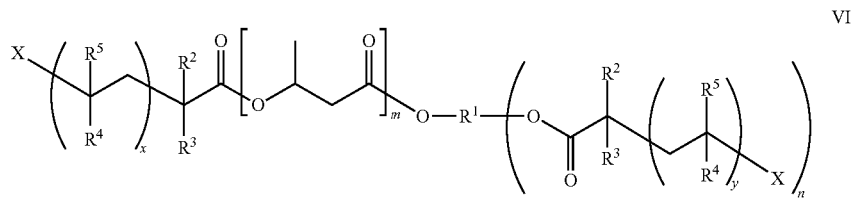

VI where:
x and y represent a polymeric repeating unit of the monomer of the compound of formula V;
$R^4$ and $R^5$ are as defined for the compound of formula V
X, $R^2$ and $R^3$ are as defined for the compound of formula III; and
$R^1$, m and n are as defined for the compound of formula I (e.g. as above and/or in the first aspect of the invention and its embodiments).

As will be appreciated, the process above provides a range of copolymers. In a fourth aspect of the invention, said block copolymers are obtained or obtainable by the process of the third aspect of the invention. For example, there may be provided a block copolymer of formula VI:

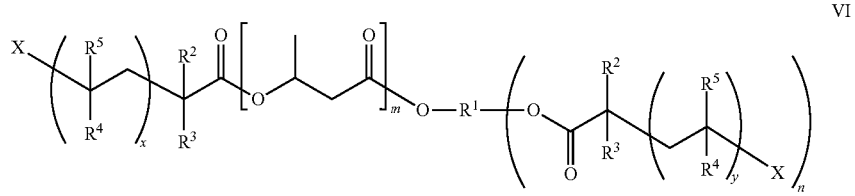

VI wherein:
m represents a polymeric repeating unit of a first polymeric component;
$R^1$ represents a straight-chain or branched $C_{1-14}$ alkyl or a $C_{3-10}$ cycloalkyl that are substituted with n ester groups;
n represents 0 to 8;

X represents Cl, Br and I;

$R^2$ and $R^3$ are independently selected from $C_{1-6}$ alkyl;

$R^4$ represents $C_{6-10}$ aryl, $C_{5-10}$ hetroaryl, $C(O)R^{6a}$, $C(O)OR^{6b}$ and $C(O)NR^{7a}R^{7b}$;

$R^5$ represents H or straight-chain or branched $C_{1-6}$ alkyl;

$R^{6a}$ and $R^{6b}$ independently represent a straight-chain or branched $C_{1-6}$ alkyl or straight-chain or branched $C_{1-6}$ alkyl substituted by one or more of the substituents selected from $OR^8$ or $NR^9R^{10}$;

$R^{7a}$, $R^{7b}$, $R^8$, $R^9$ and $R^{10}$ are independently selected from H or straight-chain or branched $C_{1-6}$ alkyl, x represents a polymeric repeating unit of a second polymeric component;

y, when present, represents a polymeric repeating unit of a third polymeric component when n is 1 up to a tenth polymeric component when n is 8; and the number average molecular weight of the block copolymer is from 15,000 to 200,000 Daltons (e.g. from 20,000 to 150,000 Daltons or from 20,000 to 200,000 daltons).

In certain embodiments, the block copolymer of formula VI may be a block copolymer of formula VIa:

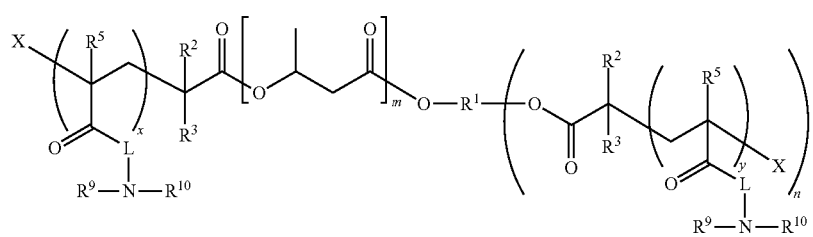

VIa wherein:

m represents a polymeric repeating unit of a first polymeric component;

$R^1$ represents a straight-chain or branched $C_{1-14}$ alkyl or a $C_{3-10}$ cycloalkyl that are substituted with n ester groups;

n represents 0 to 8;

X represents Cl, Br and I;

$R^2$ and $R^3$ are independently selected from $C_{1-6}$ alkyl;

$R^5$ represents straight-chain or branched $C_{1-6}$ alkyl;

$R^9$ and $R^{10}$ are independently selected from straight-chain or branched $C_{1-6}$ alkyl, x represents a polymeric repeating unit of a second polymeric component;

y, when present, represents a polymeric repeating unit of a third polymeric component when n is 1 up to a tenth polymeric component when n is 8;

L represents a straight-chain or branched —$C_{1-6}$ alkylene or a straight-chain or branched —O—$C_{1-6}$ alkylene (e.g. L represents a straight-chain or branched —O—$C_{1-6}$ alkylene); and the number average molecular weight of the block copolymer is from 15,000 to 200,000 Daltons (e.g. from 20,000 to 150,000 Daltons or from 20,000 to 200,000 daltons).

As noted hereinbefore, the resulting copolymers may be further functionalised. Thus, in a fifth aspect of the invention, when $R^4$ represents $C(O)R^{6a}$ or $C(O)OR^{6b}$, where $R^{6a}$ and $R^{6b}$ independently represent a $C_{1-6}$ straight-chain or branched alkyl substituted by a $NR^9R^{10}$ substituent and $R^1$ to $R^3$, $R^5$, and $R^7$ to $R^{10}$ are as defined in the third aspect of the invention in a compound of formula VI, there is provided a process that comprises:

(i) reacting the compound of formula VI:

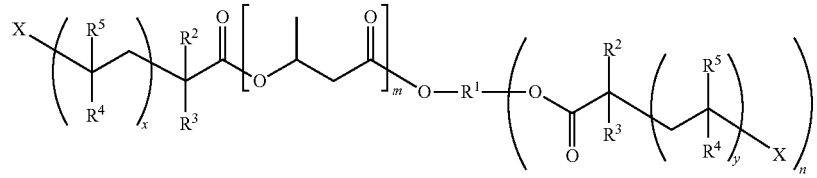

VI as defined hereinebefore, with a compound of formula VII:

$$R^{11}—Z \qquad \text{VII}$$

where:

$R^{11}$ represents straight-chain or branched $C_{1-6}$ alkyl or straight-chain or branched $C_{1-6}$ alkyl substituted with one or more of $C_{6-10}$ aryl, $C_{5-10}$ heteroaryl and OH; and Z represents Br, Cl or I, to provide a quarternised compound of formula VIII:

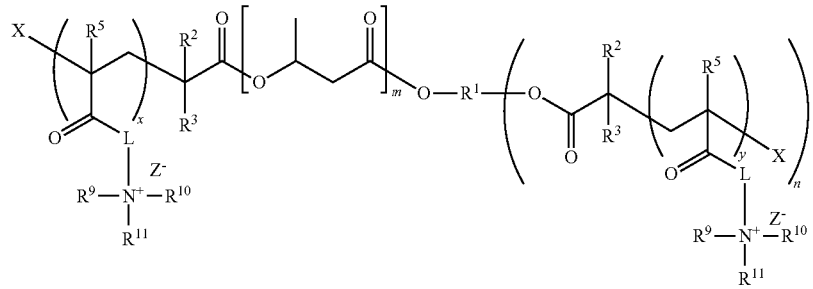

VIII where:

L represents a straight-chain or branched —$C_{1-6}$ alkylene or a straight-chain or branched —O—$C_{1-6}$ alkylene (e.g. L represents a straight-chain or branched —O—$C_{1-6}$ alkylene);

$R^9$ and $R^{19}$ are independently selected from straight-chain or branched $C_{1-6}$ alkyl;

$R^{11}$ and Z are as defined for the compound of formula VII hereinbefore;

x and y are as defined for the compound of formula VI in the fourth and fifth aspects of the invention;

$R^4$ and $R^5$ are as defined for the compound of formula V in the fourth and fifth aspects of the invention;

X, $R^2$ and $R^3$ are as defined for the compound of formula III in the third aspect of the invention; and $R^1$, m and n are as defined for the compound of formula I in the first or third aspects of the invention (and any of their embodiments).

The resulting functionalised (quarternised) block copolymer of the fifth aspect of the invention is provided as the sixth aspect of the invention as a block copolymer having formula VIII:

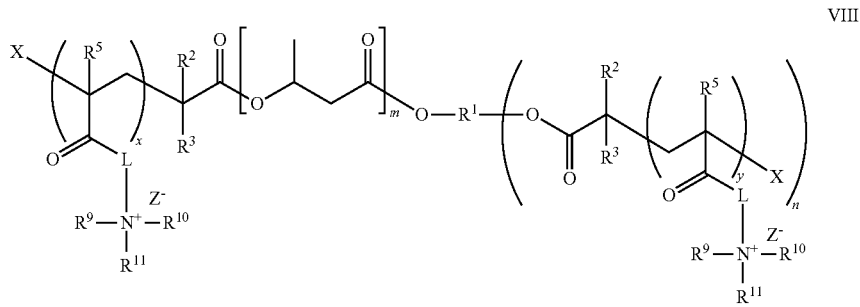

VIII wherein:
m represents a polymeric repeating unit of a first polymeric component;
$R^1$ represents a straight-chain or branched $C_{1-14}$ alkyl or a $C_{3-10}$ cycloalkyl that are substituted with n ester groups;
n represents 0 to 8;
X represents Cl, Br and I;
$R^2$ and $R^3$ are independently selected from $C_{1-6}$ alkyl;
$R^5$ represents straight-chain or branched $C_{1-6}$ alkyl;
$R^9$ and $R^{10}$ are independently selected from straight-chain or branched $C_{1-6}$ alkyl,
$R^{11}$ represents straight-chain or branched $C_{1-6}$ alkyl or straight-chain or branched $C_{1-6}$ alkyl substituted with one or more of $C_{6-10}$ aryl, $C_{5-10}$ hetroaryl and OH;
Z represents Br, Cl or I;
x represents a polymeric repeating unit of a second polymeric component;
y, when present, represents a polymeric repeating unit of a third polymeric component when n is 1 up to a tenth polymeric component when n is 8;
L represents a straight-chain or branched —$C_{1-6}$ alkylene or a straight-chain or branched —O—$C_{1-6}$ alkylene (e.g. L represents a straight-chain or branched —O—$C_{1-6}$ alkylene); and
the number average molecular weight of the block copolymer is from 15,000 to 200,000 Daltons (e.g. from 20,000 to 150,000 Daltons or from 20,000 to 200,000 daltons).

In the third to sixth aspects of the invention (and embodiments thereof):
(a) $R^1$ may represent a straight-chain or branched $C_{1-6}$ alkyl and n represents 0 to 5 (e.g. $R^1$ may represents a straight-chain $C_{2-6}$ alkyl and n represents 0 to 4 or $R^1$ may represent a straight-chain $C_{4-6}$ alkyl (such as when n is 0), or $R^1$ may represent hexyl or a fragment selected from formula Ia-Ic,

Ia

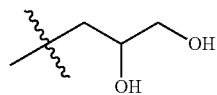

Ib

-continued

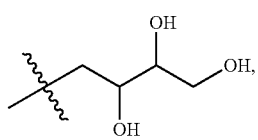

Ic where the wavy line represents the point of attachment of the fragment to the polymer;
(b) X represents Cl, or, more particularly, Br;
(c) $R^2$, $R^3$ and $R^5$ are independently selected from $C_{1-2}$ alkyl;
(d) $R^{11}$ represents straight-chain or branched $C_{1-3}$ alkyl or straight-chain or branched $C_{1-3}$ alkyl substituted by phenyl;
(e) n represents 0 to 4;
(f) L represents a straight-chain or branched —O—$C_{1-2}$ alkylene;
(g) the number average molecular weight of the block copolymer is from 15,000 to 165,000 Daltons (e.g. from 55,000 to 163,000 Daltons, such as from 19,000 to 41,000 Daltons).

As described hereinbefore, the copolymerisation process may also be conducted using reversible addition-fragmentation chain-transfer (RAFT) polymerization. Thus, in an seventh aspect of the invention, there is provided a process that comprises functionalising the compound of formula I (as described in the first aspect of the invention and in its embodiments) with a suitable reversible addition-fragmentation chain-transfer (RAFT) polymerization agent to form a RAFT precursor compound and reacting the RAFT precursor compound with a monomer suitable for use in RAFT polymerization to form a RAFT-polymerised block copolymer. Thus in a eighth aspect of the invention, there is provided a block copolymer that is obtained or obtainable from the process of the eighth aspect of the invention.

In a ninth aspect of the invention there is provided a process further comprises reacting the compound of formula I (as described in the first aspect of the invention and in its embodiments) with a suitable di- or polyisocyanate to form a polyurethane. The di- or polyisocyanate may be selected from one or more of the group consisting of diphenylmethane diisocyanate, toluene diisocyanate, hexamethylene diisocyanate, isophorone diisocyanate and polymeric diphenylmethane diisocyanate. Thus in a tenth aspect of the invention, there is provided a block copolymer that is obtained or obtainable from the process of the eighth aspect of the invention.

Non-limiting examples that embody certain aspects of the invention will now be described.

EXAMPLES

Materials and Methods

Natural source poly[(R)-3-hydroxybutyrate] (P3HB or PHB) was supplied by Aldrich and purified by dissolving it in chloroform followed by filtration and subsequent precipitation in hexane before use. The Mn and Mw of the purified PHB were $6.0 \times 10^4$ and $7.1 \times 10^4$ g/mol, respectively. Bis(2-methoxyethyl) ether (anhydrous diglyme, 99%), dibutyltin dilaurate (95%), ethylene glycol (99%), 1-hexanol, glycerol (99%), erythritol, triethylamine (TEA), benzyl bromide (Fluka), anhydrous tetrahydrofuran were purchased from Aldrich and used as received.

Example 1

Synthesis of Multiarm PHB (One-Arm)

PHB with one OH termination (PHB-01) was prepared by transesterification between the natural source PHB and hexanol using dibutyltin dilaurate in diglyme. Typically, 10.5 g (Mn=$6.0 \times 10^4$, $1.77 \times 10^{-4}$ mol) (1.0 equivalent) of purified PHB was dissolved in 120 mL of diglyme in a 250-mL two-neck round bottom flask, under $N_2$ atmosphere, at 140° C. Then, 6.78 mL (0.053 mol) (300 equivalent, ten times in excess) of hexanol was added into the reaction flask. About 0.10 mL of dibutyltin dilaurate was added, and the reaction was continued for 4 days. The resultant PHB—OH was precipitated in diethyl ether and further purified by washing with DI water 4 times. Then, the product was freeze-dried. The yield was 60% and above after isolation and purification.

Example 2

Synthesis of Multiarm PHB (Two-Arm)

Telechelic hydroxylated PHB (PHB-02) with various molecular weights were prepared by transesterification between the natural source PHB and ethylene glycol using dibutyltin dilaurate in diglyme. The reaction scheme is displayed in FIG. 2.

Typically, 10 g (Mn=$6.0 \times 10^4$, $1.66 \times 10^{-4}$ mol) (1.0 equivalent) of purified PHB was dissolved in 120 mL of diglyme in a 250-mL two-neck round bottom flask, under $N_2$ atmosphere, at 140° C. Then, 2.77 mL (0.05 mol) (300 equivalent, ten times in excess) of ethylene glycol was added into the reaction flask. Dibutyltin dilaurate was dissolved in diglyme, and was added gradually over 2-3 days. Total 0.21 g of dibutyltin dilaurate was added. The resultant PHB-diol was precipitated in diethyl ether and further purified by washing with DI water 4 times. Then, the product was freeze-dried. The yield was 80% and above after isolation and purification.

The progress of the transesterification was monitored by m.w. analysis by using GPC (THF as mobile phase). The diminishing trend of the m.w. over time was plotted in FIG. 3. As shown, the molecular weight ($M_n$) decreased from 60,000 Da to 2,000 Da over the course of the transesterification reaction.

Example 3

Synthesis of Multiarm PHB (Three-Arm)

PHB with 3-OH terminal groups (PHB-03) was prepared by transesterification between the natural source PHB and glycerol using dibutyltin dilaurate in diglyme. Typically, 15.5 g (Mn=$6.0 \times 10^4$, $2.62 \times 10^{-4}$ mol) (1.0 equivalent) of purified PHB was dissolved in 300 mL of diglyme in a 250-mL two-neck round bottom flask, under $N_2$ atmosphere, at 140° C. Then, 5.75 mL (0.0786 mol) (300 equivalent, ten times in excess) of glycerol was added into the reaction flask. About 0.10 mL of dibutyltin dilaurate was added, and the reaction was continued for 5 days. The resultant PHB-triol was precipitated in diethyl ether and further purified by washing with DI water 4 times. Then, the product was freeze-dried. The yield was 70% and above after isolation and purification.

Example 4

Synthesis of Multiarm PHB (Four-Arm)

PHB with 4-OH terminal groups (PHB-04) was prepared by transesterification between the natural source PHB and erythritol using dibutyltin dilaurate in diglyme. Typically, 10.4 g (Mn=$6.0 \times 10^4$, $1.76 \times 10^{-4}$ mol) (1.0 equivalent) of purified PHB was dissolved in 100 mL of diglyme in a 250-mL two-neck round bottom flask, under $N_2$ atmosphere, at 140° C. Then, 6.75 g (0.0368 mol) (300 equivalent, ten times in excess) of erythritol was added into the reaction flask. About 0.15 mL of dibutyltin dilaurate was added, and the reaction was continued for 2 days. The resultant PHB-tetra-ol was precipitated in diethyl ether and further purified by washing with DI water 4 times. Then, the product was freeze-dried. The yield was 80% and above after isolation and purification.

Example 5

Br-Functionalization

The reaction discussed below is depicted in the first reaction of FIG. 4.

Dried multiarm PHB, for example, 1.0 g of PHB-02 (PHB-diol) (Mn=2055, $4.87 \times 10^{-4}$ mol) (1.0 equivalent) was dissolved 10 mL of anhydrous tetrahydrofuran (THF) with stirring in a 250-mL two-neck round bottom flask, and placed in an ice bath, under $N_2$ atmosphere. Then, 0.33 mL of triethylamine (TEA) (4.8 equivalent) was added to the flask. Then, 0.24 mL of BiBB ($1.95 \times 10^{-3}$ mol) (4.0 equivalent) in 10 mL anhydrous THF was added drop-wise to the round bottom flask over a period of 1 h at 4° C. The mixture was stirred at RT for 24 h. The final reaction mixture was centrifuged to discard the deposition, while the supernatant was precipitated in diethyl ether. The PHB-02Br was dried under reduced pressure for 2 days. The yield was 60% and above after isolation and purification.

PHB-01, PHB-03 and PHB-04 were reacted in a similar manner to generate PHB-01Br, PHB-03Br and PHB-04Br.

Example 6

Synthesis of Multiarm PHB-DMAEMA Via Atom-Transfer Radical-Polymerization (ATRP)

The reaction discussed below is depicted in the second reaction of FIG. 4.

Multiarm PHB-PDMAEMA, for example, PHB-02-PDMAEMA was synthesized using a molar feed ratio [DMAEMA]/[PHB02Br (0.25 g, Mn=2400 g/mol, 4.16×

$10^{-4}$ mol)]/[CuBr]/[HMTETA] of 400:1.0:2.0:2.4. The reaction was performed in 50 mL round bottom flask equipped with a magnetic stirrer bar and under typical conditions for ATRP. DMAEMA, PHB-02Br, and HMTETA were introduced into the flask. About 12 mL of dioxane was added to dissolve the reactants. After complete dissolution, the reaction mixture was degassed by bubbling $N_2$ for 30 min. Then CuBr was added into the mixture under $N_2$ atmosphere. The reaction mixture was purged with $N_2$ for another 1-2 min, before the flask was sealed with a rubber stopper. The polymerization was allowed to proceed under continuous stirring at 50° C. for 24 h. The reaction was stopped by diluting with THF. The catalyst complex was removed by passing the blue dilute polymer solution through a short aluminium oxide column. A colorless solution was obtained. After removal of THF in a rotary evaporator, the PHB-02-PDMAEMA was precipitated in excess n-hexane and dried under reduced pressure for 2 days. The yield was 60% and above after isolation and purification.

PHB-01Br, PHB-03Br and PHB-04Br were reacted in a similar manner to generate PHB-01-PDMAEMA, PHB-03-PDMAEMA and PHB-04-PDMAEMA.

Example 7

Quaternization of PHB-PDMAEMAs

The reaction discussed below is depicted in the third reaction of FIG. 4.

Multiarm PHB-PDMAEMA was quaternized with benzyl bromide (BB). Typically, PHB-02-PDMAEMA (2.0 g, Mn=7350 g/mol) was dissolved in 5 mL of THF. Theoretically, about 73 wt. % of the polymer was DMAEMA. Mole of DMAEMA units was 9.3×10-3 mol. Then, equilmolar of BB (1.1 mL) was added. The reaction was allowed to proceed under continuous stirring at 60° C. for 24 h. After the reaction, 3-5 mL of THF was added to the mixture. It was precipitated in excess of n-hexane, and dried under reduced pressure. The yield was 80% and above after isolation and purification.

PHB-01-PDMAEMA, PHB-03-PDMAEMA and PHB-04-PDMAEMA were reacted in a similar manner to generate other quaternized multiarm PHB-PDMAEMAs (Q-PHB-PDMAEMAs).

Molecular Characterization

GPC measurements were performed on a Waters GPC system equipped with Waters Styragel columns, a Waters-2420 ELS detector, at 40° C. HPLC grade THF was used as the eluent at a low flow rate of 1.0 mL/min. Monodispersed PMMA standards were used to generate the calibration curve.

Aqueous GPC measurements were performed on a Waters GPC system equipped with Waters Styragel columns, a Waters-2414 refractive index detector, at 37° C. Acetate buffer solution (pH=4.5) was used as the eluent at a low flow rate of 0.6 mL/min. Monodispersed PEG standards were used to generate the calibration curve.

$^1$H NMR (400 MHz) spectra were recorded on a Bruker AV-400 NMR spectrometer at room temperature, by accumulation of 16 scans, using $CDCl_3$ or $D_2O$ as the solvent.

Table 1 lists the GPC results for each of the Multi-arm PHBs produced as described above.

TABLE 1

GPC results of multiarm PHB

| Polymer ID | GPC Mn Da | GPC Mw Da | PDI |
|---|---|---|---|
| Purified PHB* | 59400 | 70800 | 1.19 |
| PHB01 | 1900 | 2000 | 1.07 |
| PHB01Br | 3300 | 3700 | 1.14 |
| PHB01-PDMAEMA# | 40800 | 64200 | 1.57 |
| PHB02 | 2100 | 2300 | 1.13 |
| PHB02Br | 2200 | 2700 | 1.20 |
| PHB02-PDMAEMA# | 29400 | 53100 | 1.80 |
| PHB03 | 6400 | 9800 | 1.54 |
| PHB03Br | 9100 | 14400 | 1.58 |
| PHB03-PDMAEMA# | 34000 | 58800 | 1.73 |
| PHB04 | 4600 | 5700 | 1.23 |
| PHB04Br | — | — | — |
| PHB04-PDMAEMA# | 19000 | 44700 | 1.73 |

All samples were characterized by using GPC, THF as mobile phase, except for #aqueous, and *$CHCl_3$ as mobile phase.

Number of Arms Calculation (Based on GPC and NMR)

Transesterification of purified PHB yielded shorter PHB chains with different number of hydroxyl arms. Table 2 shows the list of $M_n$ of these PHB as compared to original purified PHB. The molecular weight of single PHB repeating unit (O—CH($CH_3$)—$CH_2$—CO) is 86 g/mol. Number of repeating units (m, as shown in FIG. 2) of PHB can be calculated by using the GPC $M_n$ minus the m.w. of transesterification agent, and divided by 86 g/mol.

TABLE 2

GPC Number-averaged molecular weights and "m" of hydroxybutyrate repeating unit

| Sample ID | Number of hydroxyl end group | GPC $M_n$ Da | Trans-esterification agent | M.w. of transesterification agent Da | m |
|---|---|---|---|---|---|
| Purified PHB | — | 59,400 | — | — | |
| PHB-01 | 1 | 1,900 | 1-hexanol | 102.17 | 21 |
| PHB-02 | 2 | 2,100 | ethylene glycol | 62.07 | 24 |
| PHB-03 | 3 | 6,400 | glycerol | 92.09 | 73 |
| PHB-04 | 4 | 4,600 | erythritol | 122.22 | 52 |

Number of Br Groups Attached to Multiarm PHBs

Figure 5A:
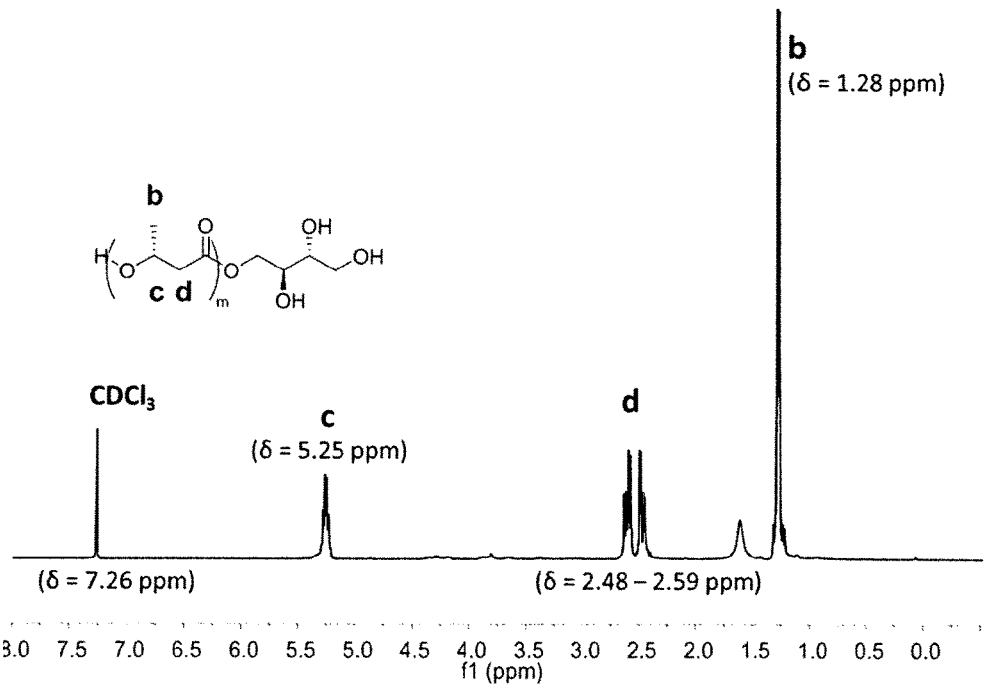
Figure 5B:
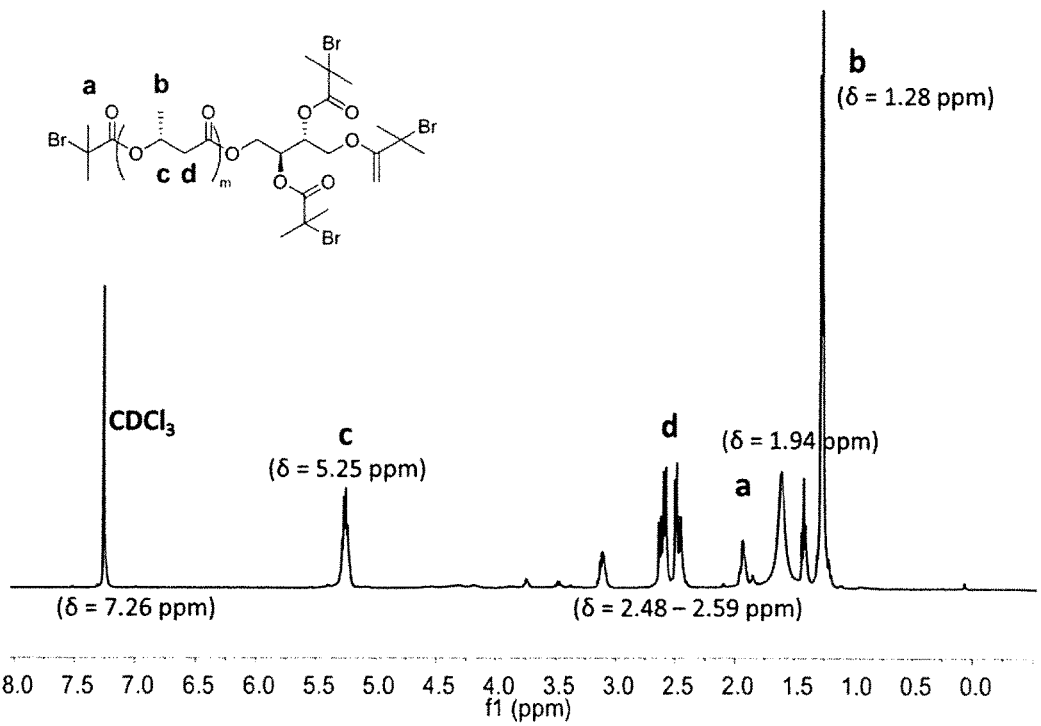

To calculate the number of Br in each polymer chain, for example, in PHB-04Br NMR spectrum (as shown in FIGS. 5A-B), peak c (δ=5.25 ppm) which was assigned to CH in PHB, is set to 52 (based on calculation in Table 2). The integration of peak a (δ=1.94 ppm) which was assigned to $(CH_3)_2$ next to Br, was recorded in Table 3. The number of Br group attached to the multiarm PHB is calculated by dividing it by 6, since "peak a" is the integration result of 6H. The same process was also use to characterise PHB-01Br, PHB-02Br and PHB-03Br.

TABLE 3

Number of Br-group in multiarm PHB based on NMR analysis

| Sample ID | Number of hydroxyl end group | Integration of "peak a" | Number of Br group |
|---|---|---|---|
| PHB-01Br | 1 | 3.5 | 0.58 |
| PHB-02Br | 2 | 8.27 | 1.4 |
| PHB-03Br | 3 | 12.50 | 2.1 |
| PHB-04Br | 4 | 23.21 | 3.9 |

From Table 3, it can be seen that the number of Br groups attached in PHB-04Br is the highest. A reason for this may be because new anhydrous THF was used for this reaction.

Number of DMAEMA Units in Each Polymer Chain

Figure 5C:
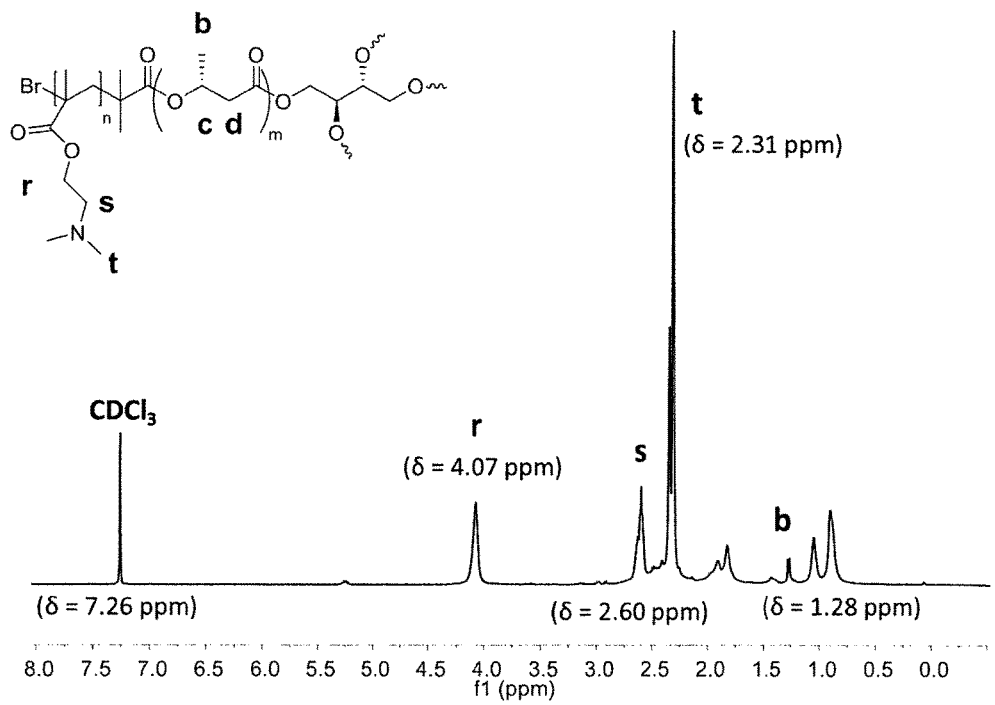

To calculate the number of DMAEMA units in each polymer chain, for example, in PHB-04-PD NMR spectrum (as shown in FIGS. 5B-C), peak b ($\delta$=1.26 ppm) which was assigned to $CH_3$ in PHB, is set to 169 (based on calculation from NMR spectrum of PHB-04Br). Integration of peak r ($\delta$=4.07 ppm) was recorded. This number is divided by 2, since it results from a $CH_2$ on the DMAEMA unit. To obtain DMAEMA unit per arm, it is further divided by 3.9 (from Table 3). The same process was also use to characterise PHB-01DMAEMA, PHB-02DMAEMA and PHB-03DMAEMA (using the appropriate adaptation of the calculation).

The number of DMAEMA repeating units are listed in Table 4.

TABLE 4

Number of DMAEMA units in multiarm PHB based on NMR analysis

| Sample ID | Number of hydroxyl end group | Integration of "peak r" | Number of DMAEMA units in each arm |
|---|---|---|---|
| PHB-01-PDMAEMA | 1 | 337 | 291 |
| PHB-02-PDMAEMA | 2 | 464 | 166 |
| PHB-03-PDMAEMA | 3 | 753 | 179 |
| PHB-04-PDMAEMA | 4 | 988 | 127 |

Degree of Quaternization

The degree of quaternization was determined by NMR analysis qualitatively, using $D_2O$ as solvent.

In FIGS. 6A and B, the peaks located at 2.27 ppm and 2.99 ppm are attributable to the methyl protons (t, N—$CH_3$) and (t', +N—$CH_3$) of the non-quaternized and quaternized moieties, respectively. We can conclude that the sample is partially quaternized if both peak t and peak t' are present. If only peak t' is observed, the sample is considered completely quaternized. All the samples were successfully fully quaternized.

Example 7

Antimicrobial Test

The solutions based on the Q-PHB-PDMAEMA were tested for efficacy in killing clinically significant pathogens: the Gram-negative bacteria (*S. aureus*) and Gram-negative bacteria (*E. coli*). The cationic PHB copolymers showed antimicrobial efficiency that is comparable to those of common antimicrobial peptides (e.g. Melittin, LL-37 etc.). Potential applications of these cationic polymers include antimicrobial coating for surgical devices and drug/gene delivery. Data for the antimicrobial activity of Q-PHB-02-PDMAEMA is provided in Table 5.

TABLE 5

| | MIC (µg/mL) | |
|---|---|---|
| Sample ID | Gram-positive bacteria *S. aureus* (n = 2) | Gram-negative bacteria *E. coli* (n = 2) |
| Q-PHB02-PDMAEMA | 32 | 32 |
| Melittin | 8 | 63 |
| LL-37 | >250 | >250 |
| Indolicidin | 130 | >250 |
| Magainin I | 130 | 130 |
| Defensin (HNP-1) | >130 | >130 |

What is claimed is:

1. A block copolymer having formula VI:

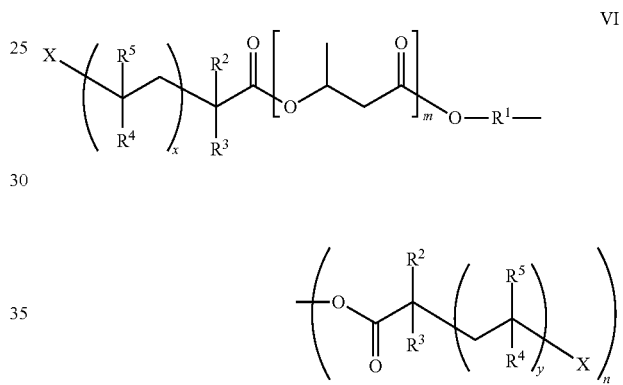

VI wherein:

m represents a polymeric repeating unit of a first polymeric component;

$R^1$ represents a straight-chain or branched $C_{1-14}$ alkyl or a $C_{3-10}$ cycloalkyl that are substituted with n ester groups;

n represents 2 to 8;

X represents Cl, Br and I;

$R^2$ and $R^3$ are independently selected from $C_{1-6}$ alkyl;

$R^4$ represents $C_{6-10}$ aryl, $C_{5-10}$ heteroaryl, $C(O)R^{6a}$, $C(O)OR^{6b}$ and $C(O)NR^{7a}R^{7b}$;

$R^5$ represents H or straight-chain or branched $C_{1-6}$ alkyl;

$R^{6a}$ and $R^{6b}$ independently represent a straight-chain or branched $C_{1-6}$ alkyl or straight-chain or branched $C_{1-6}$ alkyl substituted by one or more of the substituents selected from $OR^8$ or $NR^9R^{10}$;

$R^{7a}$, $R^{7b}$, $R^8$, $R^9$ and $R^{10}$ are independently selected from H or straight-chain or branched $C_{1-6}$ alkyl, x represents a polymeric repeating unit of a second polymeric component;

y, when present, represents a polymeric repeating unit of a third polymeric component when n is 2 up to a tenth polymeric component when n is 8; and the number average molecular weight of the block copolymer is from 15,000 to 200,000 Daltons.

2. The block copolymer of claim 1 having the structure of formula VIa:

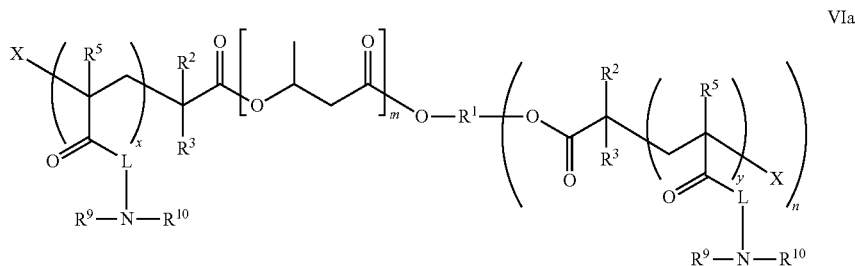

VIa wherein:
m represents a polymeric repeating unit of a first polymeric component;
$R^1$ represents a straight-chain or branched $C_{1-14}$ alkyl or a $C_{3-10}$ cycloalkyl that are substituted with n ester groups;
n represents 2 to 8;
X represents Cl, Br and I;
$R^2$ and $R^3$ are independently selected from $C_{1-6}$ alkyl;
$R^5$ represents straight-chain or branched $C_{1-6}$ alkyl;
$R^9$ and $R^{10}$ are independently selected from straight-chain or branched $C_{1-6}$ alkyl,
x represents a polymeric repeating unit of a second polymeric component;
y, when present, represents a polymeric repeating unit of a third polymeric component when n is 2 up to a tenth polymeric component when n is 8;
L represents a straight-chain or branched —$C_{1-6}$ alkylene or a straight-chain or branched —O—$C_{1-6}$ alkylene; and
the number average molecular weight of the block copolymer is from 15,000 to 200,000 Daltons.

3. A block copolymer having formula VIII:

$R^{11}$ represents straight-chain or branched $C_{1-6}$ alkyl or straight-chain or branched $C_{1-6}$ alkyl substituted with one or more of $C_{6-10}$ aryl, $C_{5-10}$ heteroaryl and OH;

Z represents Br, Cl or I;

x represents a polymeric repeating unit of a second polymeric component;

y, when present, represents a polymeric repeating unit of a third polymeric component when n is 2 up to a tenth polymeric component when n is 8;

L represents a straight-chain or branched —$C_{1-6}$ alkylene or a straight-chain or branched —O—$C_{1-6}$ alkylene; and the number average molecular weight of the block copolymer is from 15,000 to 200,000 Daltons.

4. A process to provide a block copolymer of formula VI, the process comprising:

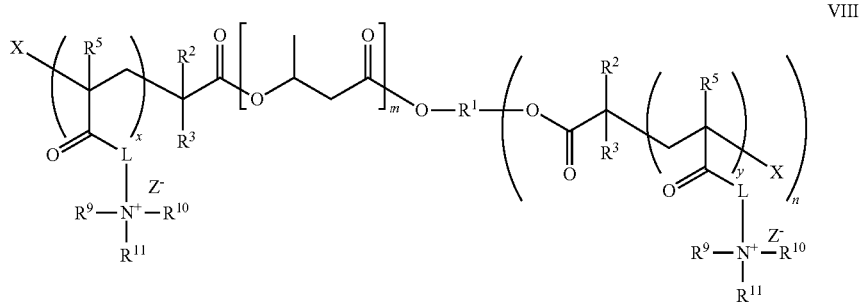

VIII wherein:
m represents a polymeric repeating unit of a first polymeric component;
$R^1$ represents a straight-chain or branched $C_{1-14}$ alkyl or a $C_{3-10}$ cycloalkyl that are substituted with n ester groups;
n represents 2 to 8;
X represents Cl, Br and I;
$R^2$ and $R^3$ are independently selected from $C_{1-6}$ alkyl;
$R^5$ represents straight-chain or branched $C_{1-6}$ alkyl;
$R^9$ and $R^{10}$ are independently selected from straight-chain or branched $C_{1-6}$ alkyl, (a) reacting a compound of formula I:

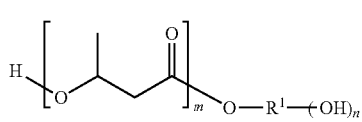

I wherein:
m represents the repeating unit of the polymer;
$R^1$ represents a straight-chain or branched $C_{1-14}$ alkyl or a $C_{3-10}$ cycloalkyl that are substituted with n hydroxyl groups;
n represents 2 to 8, and wherein the number average molecular weight of the polymer is from 500 to 80,000 Daltons, with a sufficient quantity of a suitable atom transfer radical polymerization (ATRP) initiator of formula III:

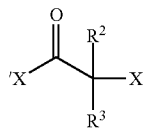

where X and 'X are independently selected from Cl, Br and I; and
$R^2$ and $R^3$ are independently selected from $C_{1-6}$ alkyl, to provide a compound of formula IV:

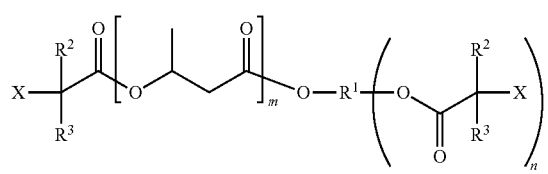

where X, $R^2$ and $R^3$ are as defined for the compound of formula III and $R^1$, m and n are as defined for the compound of formula I; and (b) reacting the compound of formula IV under ATRP conditions with a monomer compound of formula V:

where:
$R^4$ represents $C_{6-10}$ aryl, $C_{5-10}$ heteroaryl, $C(O)R^{6a}$, $C(O)OR^{6b}$ and $C(O)NR^{7a}R^{7b}$;
$R^5$ represents H or straight-chain or branched $C_{1-6}$ alkyl;
$R^{6a}$ and $R^{6b}$ independently represent a straight-chain or branched $C_{1-6}$ alkyl or straight-chain or branched $C_{1-6}$ alkyl substituted by one or more of the substituents selected from $OR^8$ or $NR^9R^{10}$;
$R^{7a}$, $R^{7b}$, $R^8$, $R^9$ and $R^{10}$ are independently selected from H or straight-chain or branched $C_{1-6}$ alkyl,
to provide a compound of formula VI:

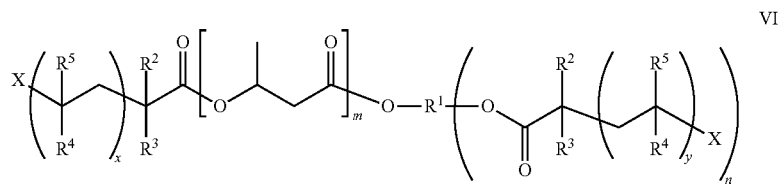

where:

x and y represent a polymeric repeating unit of the monomer of the compound of formula V;
$R^4$ and $R^5$ are as defined for the compound of formula V
X, $R^2$ and $R^3$ are as defined for the compound of formula III; and
$R^1$ m and n are as defined for the compound of formula I.

5. A process to functionalize a block copolymer having formula VI:

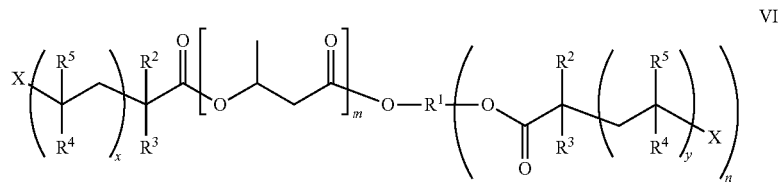

wherein:
m represents a polymeric repeating unit of a first polymeric component;
$R^1$ represents a straight-chain or branched $C_{1-14}$ alkyl or a $C_{3-10}$ cycloalkyl that are substituted with n ester groups;
n represents 2 to 8;
X represents Cl, Br and I;
$R^2$ and $R^3$ are independently selected from $C_{1-6}$ alkyl;
$R^4$ represents $C_{6-10}$ aryl, $C_{5-10}$ heteroaryl, $C(O)R^{6a}$, $C(O)OR^{6b}$ and $C(O)NR^{7a}R^{7b}$;
$R^5$ represents H or straight-chain or branched $C_{1-6}$ alkyl;
$R^{6a}$ and $R^{6b}$ independently represent a straight-chain or branched $C_{1-6}$ alkyl or straight-chain or branched $C_{1-6}$ alkyl substituted by one or more of the substituents selected from $OR^8$ or $NR^9R^{10}$;
$R^{7a}$, $R^{7b}$, $R^8$, $R^9$ and $R^{10}$ are independently selected from H or straight-chain or branched $C_{1-6}$ alkyl,
x represents a polymeric repeating unit of a second polymeric component;
y, when present, represents a polymeric repeating unit of a third polymeric component when n is 2 up to a tenth polymeric component when n is 8; and
the number average molecular weight of the block copolymer is from 15,000 to 200,000 Daltons; wherein when $R^4$ represents $C(O)R^{6a}$ or $C(O)OR^{6b}$, where $R^{6a}$ and $R^{6b}$ independently represent a $C_{1-6}$ straight-chain or branched alkyl substituted by a $NR^9R^{10}$ substituent, the process comprises:

(i) reacting the compound of formula VI with a compound of formula VII:

     VII where:
$R^{11}$ represents straight-chain or branched $C_{1-6}$ alkyl or straight-chain or branched $C_{1-6}$ alkyl substituted with one or more of $C_{6-10}$ aryl, $C_{5-10}$ heteroaryl and OH; and
Z represents Br, Cl or I,
to provide a quarternised compound of formula VIII:

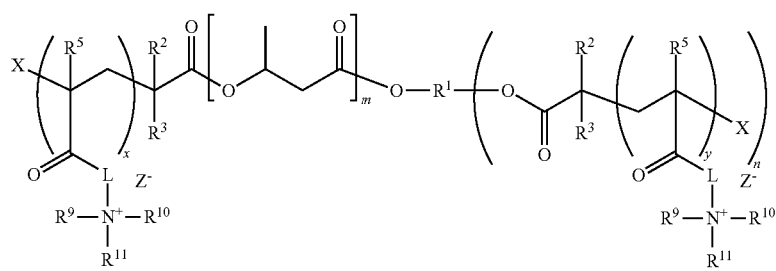

where:
L represents a straight-chain or branched —$C_{1-6}$ alkylene or a straight-chain or branched —O—$C_{1-6}$ alkylene, $R^9$ and $R^{10}$ are independently selected from straight-chain or branched $C_{1-6}$ alkyl;
$R^{11}$ and Z are as defined for the compound of formula VII;
x and y are as defined for the compound of formula VI;
$R^4$ and $R^5$ are as defined for the compound of formula V:

   V where:
$R^4$ represents $C_{6-10}$ aryl, $C_{5-10}$ heteroaryl, $C(O)R^{6a}$, $C(O)OR^{6b}$ and $C(O)NR^{7a}R^{7b}$;
$R^5$ represents H or straight-chain or branched $C_{1-6}$ alkyl;
$R^{6a}$ and $R^{6b}$ independently represent a straight-chain or branched $C_{1-6}$ alkyl or straight-chain or branched $C_{1-6}$ alkyl substituted by one or more of the substituents selected from $OR^8$ or $NR^9R^{10}$;
$R^{7a}$, $R^{7b}$, $R^8$, $R^9$ and $R^{10}$ are independently selected from H or straight-chain or branched $C_{1-6}$ alkyl;
X, $R^2$ and $R^3$ are as defined for the compound of formula III:

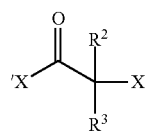   III where X and 'X are independently selected from Cl, Br and I; and
$R^2$ and $R^3$ are independently selected from $C_{1-6}$ alkyl; and $R^1$ m and n are as defined for the compound of formula I:

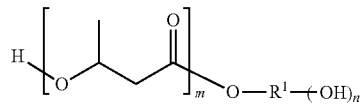   I wherein:

m represents the repeating unit of the polymer;
$R^1$ represents a straight-chain or branched $C_{1-14}$ alkyl or a $C_{3-10}$ cycloalkyl that are substituted with n hydroxyl groups;
n represents 0 to 8, and wherein
the number average molecular weight of the polymer is from 500 to 80,000 Daltons.

6. The copolymer according to claim 1, wherein $R^1$ represents a straight-chain or branched $C_{1-6}$ alkyl and n represents 2 to 5.

7. The copolymer according to claim 6, wherein $R^1$ represents a straight-chain $C_{2-5}$ alkyl and n represents 2 to 4 or $R^1$ represents a straight-chain $C_{4-6}$ alkyl.

8. The copolymer according to claim 1, wherein:

(a) X represents Cl or Br; and/or
(b) $R^2$, $R^3$ and $R^5$ are independently selected from $C_{1-2}$ alkyl; and/or
(c) n represents 2 to 4; and/or
(d) the number average molecular weight of the block copolymer is from 15,000 to 165,000 Daltons.

9. The copolymer according to claim 2, wherein L represents a straight-chain or branched —O—$C_{1-2}$ alkylene.

10. The copolymer according to claim 3, wherein L represents a straight-chain or branched —O—$C_{1-2}$ alkylene.

11. The copolymer according to claim 2, wherein $R^{11}$ represents straight-chain or branched $C_{1-3}$ alkyl or straight-chain or branched $C_{1-3}$ alkyl substituted by phenyl.

* * * * *